US 10,669,944 B2
Jun. 2, 2020

(12) United States Patent
Petkova et al.

(10) Patent No.: US 10,669,944 B2
(45) Date of Patent: Jun. 2, 2020

(54) COOLING SHROUDS

(71) Applicant: General Electric Company, Schenectady, NY (US)

(72) Inventors: Stefka Petkova Petkova, Forest Park, OH (US); Ronald Bruce Schofield, Clarksville, OH (US)

(73) Assignee: General Electric Company, Schenectady, NY (US)

( * ) Notice: Subject to any disclaimer, the term of this patent is extended or adjusted under 35 U.S.C. 154(b) by 443 days.

(21) Appl. No.: 15/353,497

(22) Filed: Nov. 16, 2016

(65) Prior Publication Data
US 2018/0135461 A1    May 17, 2018

(51) Int. Cl.
*F02C 7/26* (2006.01)
*F02C 7/264* (2006.01)
(Continued)

(52) U.S. Cl.
CPC .......... *F02C 7/264* (2013.01); *F02C 7/20* (2013.01); *F02C 7/26* (2013.01); *F02C 7/266* (2013.01);
(Continued)

(58) Field of Classification Search
CPC .. F02C 7/26; F02C 7/264; F02C 7/266; F02C 7/32; F02C 7/20
See application file for complete search history.

(56) References Cited

U.S. PATENT DOCUMENTS 4,696,324 A * 9/1987 Petronko .......... F16L 59/04
137/375
5,348,044 A * 9/1994 Eugene .......... F16L 59/161
137/312
(Continued)

FOREIGN PATENT DOCUMENTS

CN    1991143 A    7/2007
CN    102562731 A   7/2012
(Continued)

OTHER PUBLICATIONS

Chinese Office Action Corresponding to Application No. 20171136505 dated Jul. 15, 2019.
(Continued)

*Primary Examiner* — Steven M Sutherland
(74) *Attorney, Agent, or Firm* — Dority & Manning, P.A.

(57) ABSTRACT

A shroud configured for installation on a component of a machine includes a shroud body including a plurality of arcuate sections hingedly coupled together, and a closure assembly including an engagement member and a receiving member. The plurality of arcuate sections include a first arcuate section hingedly coupled to one of the arcuate sections at a first edge and including the engagement member at an opposing second edge, and a second arcuate section hingedly coupled to one of the arcuate sections at a first edge and including the receiving member at an opposing second edge. The shroud body is configured to transition between an open configuration in which the engagement member and the receiving member are spaced apart from one another and
(Continued)

a closed configuration in which the engagement member engages with the receiving member, the closure assembly maintaining the shroud body in the closed configuration.

21 Claims, 12 Drawing Sheets

(51) Int. Cl.
*F02C 7/32* (2006.01)
*F02C 7/20* (2006.01)
*F02C 7/266* (2006.01)

(52) U.S. Cl.
CPC ............ *F02C 7/32* (2013.01); *F05D 2230/54* (2013.01); *F05D 2230/60* (2013.01); *F05D 2240/35* (2013.01); *F05D 2260/20* (2013.01); *Y02T 50/672* (2013.01); *Y02T 50/675* (2013.01)

(56) References Cited

U.S. PATENT DOCUMENTS

| | | | |
|---|---|---|---|
| 5,533,330 A | 7/1996 | Mullooly et al. | |
| 6,248,952 B1* | 6/2001 | Reeves | H02G 3/06 16/2.1 |
| 6,362,562 B1 | 3/2002 | Rossi | |
| 7,013,651 B2 | 3/2006 | Bruno et al. | |
| 7,216,488 B2 | 5/2007 | Howell et al. | |
| 7,591,136 B2 | 9/2009 | Bernier et al. | |
| 7,637,094 B2 | 12/2009 | Costello et al. | |
| 8,113,005 B2 | 2/2012 | Götz et al. | |
| 8,181,440 B2 | 5/2012 | Sandelis | |
| 8,689,406 B2 | 4/2014 | Ito | |
| 8,707,985 B2* | 4/2014 | Goss | A62C 35/68 137/312 |
| 9,133,770 B2* | 9/2015 | Henkle | F02C 7/22 |
| 9,255,522 B2 | 2/2016 | Sancewich et al. | |
| 9,316,337 B2* | 4/2016 | Bellis | F16L 35/00 |
| 9,318,236 B2 | 4/2016 | Cox et al. | |
| 2007/0038394 A1* | 2/2007 | Gagnon | G01D 4/008 702/61 |
| 2007/0107791 A1* | 5/2007 | Rice | B29C 70/32 138/99 |
| 2013/0313960 A1 | 11/2013 | Francesconi | |
| 2014/0352275 A1 | 12/2014 | McCormick | |

FOREIGN PATENT DOCUMENTS

| | | |
|---|---|---|
| CN | 205349825 U | 6/2016 |
| CN | 105782584 A | 7/2016 |
| CN | 205400874 U | 7/2016 |
| CN | 105909917 A | 8/2016 |
| EP | 1619369 A2 | 5/2005 |
| EP | 2080880 A1 | 7/2009 |
| JP | S57179338 A | 11/1982 |

OTHER PUBLICATIONS

Chinese Office Action Corresponding to Application No. 201711136505 dated Mar. 20, 2020.

* cited by examiner

COOLING SHROUDS

BACKGROUND

The field of the disclosure relates generally to cooling shrouds and, more particularly, to a cooling shroud for cooling one or more heated components.

At least some known machinery systems include heated components, or components that experience a heat load. In some of these known machinery systems, such heated components are cooled using passive and/or active cooling systems. Where spaces surrounding these heated components are small, installation and/or repair of the cooling systems is difficult. As one particular example, gas turbine engines, such as those used in commercial aircraft, typically include a plurality of heating and cooling systems to ensure that components of the engines are maintained at appropriate temperatures. One specific example of engine component cooling is a cooling shroud positioned on igniter leads of the engine ignition system. At least some known cooling shrouds are constructed of two separate pieces that must be held together over the ignition lead and secured with a clamp. Ignition systems are repaired and/or replaced relatively often, so removal and installation of these cooling shrouds occurs relatively frequently. However, the ignition leads are typically located in small engine compartments, which makes such removal and installation of these cooling shrouds difficult. Specifically, these cooling shrouds require two-handed installation—one hand to hold the two pieces together and the other to manipulate and tighten the clamp that is to secure the cooling shroud in place. As engine compartments continue to be designed smaller, two-handed installation of these cooling shrouds may become unfeasible.

BRIEF DESCRIPTION

In one aspect, a shroud configured for installation on a component of a gas turbine engine is provided. The shroud includes a shroud body including a plurality of arcuate sections hingedly coupled together, and a closure assembly including an engagement member and a receiving member. The plurality of arcuate sections includes a first arcuate section hingedly coupled to one of the plurality of arcuate sections at a first edge of the first arcuate section and including the engagement member at an opposing second edge of the first arcuate section, and a second arcuate section hingedly coupled to one of the plurality of arcuate sections at a first edge of the second arcuate section and including the receiving member at an opposing second edge of the second arcuate section. The shroud body is configured to transition between an open configuration in which the engagement member and the receiving member are spaced apart from one another and a closed configuration in which the engagement member engages with the receiving member, the closure assembly maintaining the shroud body in the closed configuration.

In another aspect, a gas turbine engine is provided. The gas turbine engine includes a core engine including a compressor, and an ignition system configured to ignite gas in the core engine. The ignition system includes a cooling shroud configured to cool a component of the ignition system. The cooling shroud includes a shroud body comprising a plurality of arcuate sections hingedly coupled together, and a closure assembly comprising an engagement member and a receiving member. The plurality of arcuate sections includes a first arcuate section hingedly coupled to one of the plurality of arcuate sections at a first edge of the first arcuate section and including the engagement member at an opposing second edge of the first arcuate section, and a second arcuate section hingedly coupled to one of the plurality of arcuate sections at a first edge of the second arcuate section and including the receiving member at an opposing second edge of the second arcuate section. The shroud body is configured to transition between an open configuration in which the engagement member and the receiving member are spaced apart from one another and a closed configuration in which the engagement member engages with the receiving member, the closure assembly maintaining the shroud body in the closed configuration.

In yet another aspect, a method of constructing a component cooling shroud configured for installation on a component of a gas turbine engine is provided. The method includes providing a plurality of arcuate sections, the arcuate sections including a first arcuate section including an engagement member at a first edge of the first arcuate section, and a second arcuate section including a receiving member at first edge of the second arcuate section. The method further includes forming a shroud body from the plurality of arcuate sections. The forming includes hingedly coupling the first arcuate section to one of the plurality of arcuate sections at an opposing second edge of the first arcuate section, and hingedly coupling the second arcuate section to one of the plurality of arcuate sections at an opposing second edge of the second arcuate section, such that the shroud body is configured to transition between an open configuration in which the engagement member and the receiving member are spaced apart from one another and a closed configuration in which the engagement member engages with the receiving member, the engagement member and the receiving member maintaining the shroud body in the closed configuration.

In a further aspect, a shroud configured for installation on a component of a gas turbine engine is provided. The shroud includes a shroud body including a plurality of arcuate sections hingedly coupled together, and a closure assembly including an engagement member and a receiving member. The plurality of arcuate sections include a first arcuate section hingedly coupled to one of the plurality of arcuate sections at a first edge of the first arcuate section and including the engagement member at the first edge of the first arcuate section, and a second arcuate section hingedly coupled to one of the plurality of arcuate sections at a first edge of the second arcuate section and including the receiving member at the first edge of the second arcuate section. The shroud body is configured to transition between an open configuration in which the engagement member and the receiving member are spaced apart from one another and a closed configuration in which the engagement member engages with the receiving member, the closure assembly maintaining the shroud body in the closed configuration.

DRAWINGS

These and other features, aspects, and advantages of the present disclosure will become better understood when the following detailed description is read with reference to the accompanying drawings in which like characters represent like parts throughout the drawings, wherein.

Figure 1:
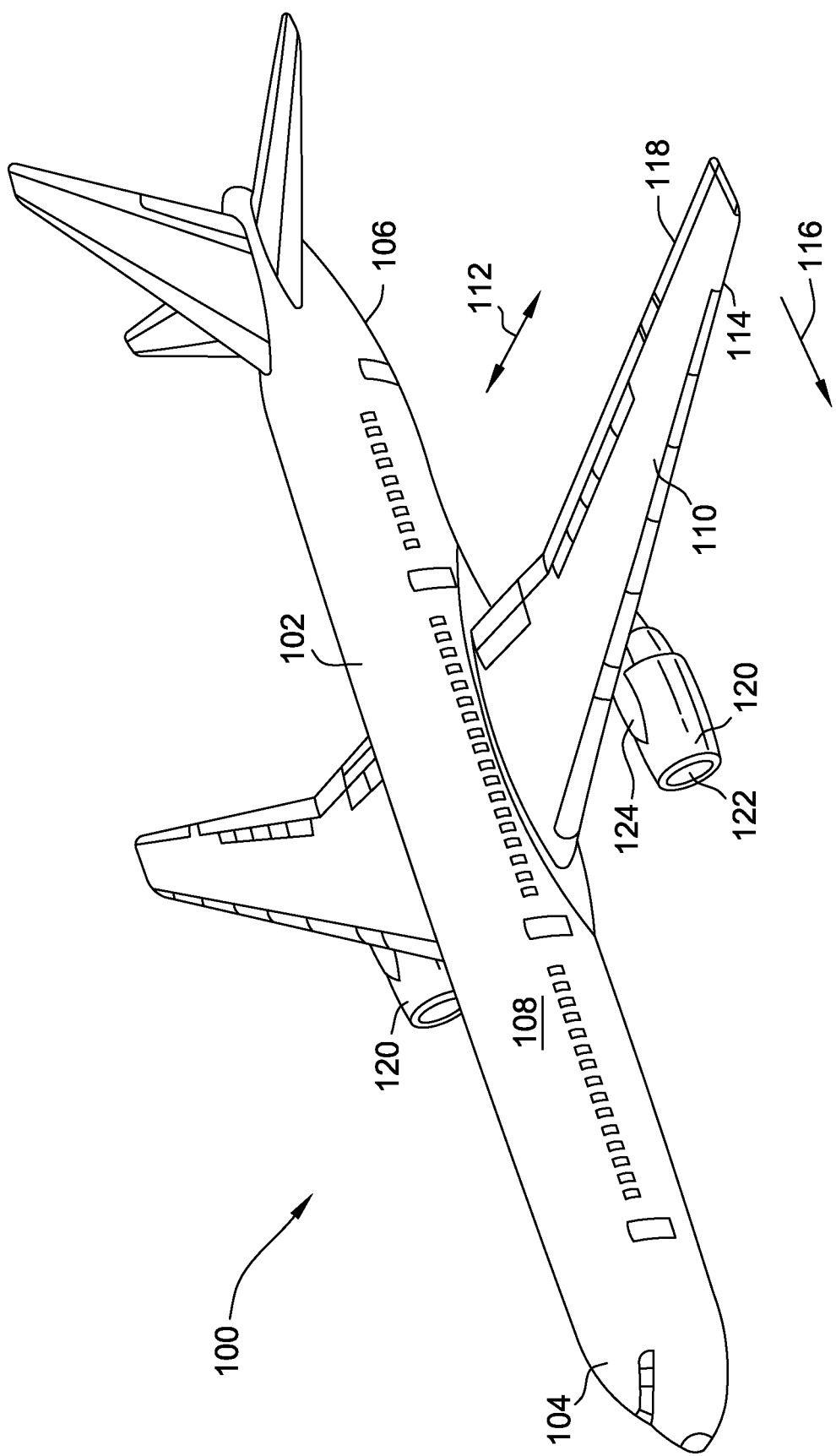
FIG. 1 is an illustration of an exemplary aircraft in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the cooling shrouds described herein provide a cost-effective method for enabling one-handed installation of cooling shrouds on one or more components of a gas turbine engine, which is currently nonviable with known cooling shrouds. The cooling shrouds described herein may be installed with a one-handed installation technique on such components as an engine ignition system and an active clearance control system of an engine casing. In the exemplary embodiment, the cooling shroud has a body with a "clam-shell" construction in which two or more sections (e.g., two halves) of the cooling shroud are hingedly coupled together. Hingedly coupling the sections together reduces the risk that one section will be dropped into the engine component while improving ease of installation. In addition, the cooling shroud further includes a closure assembly that provides preliminary securement of the shroud sections. The closure assembly enables an installer of the shroud to clasp the sections together with one hand, and the closure assembly retains the shroud in position in a closed configuration. Accordingly, the installer need not hold the sections together while securing the cooling shroud in place (e.g., with a clamp such as a hose clamp or ratcheting clamp), further improving the ease of installation and, more particularly, enabling one-handed installation within the engine compartment.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120, such as, but not limited to a turbofan engine, configured to drive a bladed rotatable member, such as, fan 122 to generate thrust. At least one engine 120 is connected to an engine pylon 124, which may connect the turbofan engine at least one engine 120 to aircraft 100.

Figure 2:
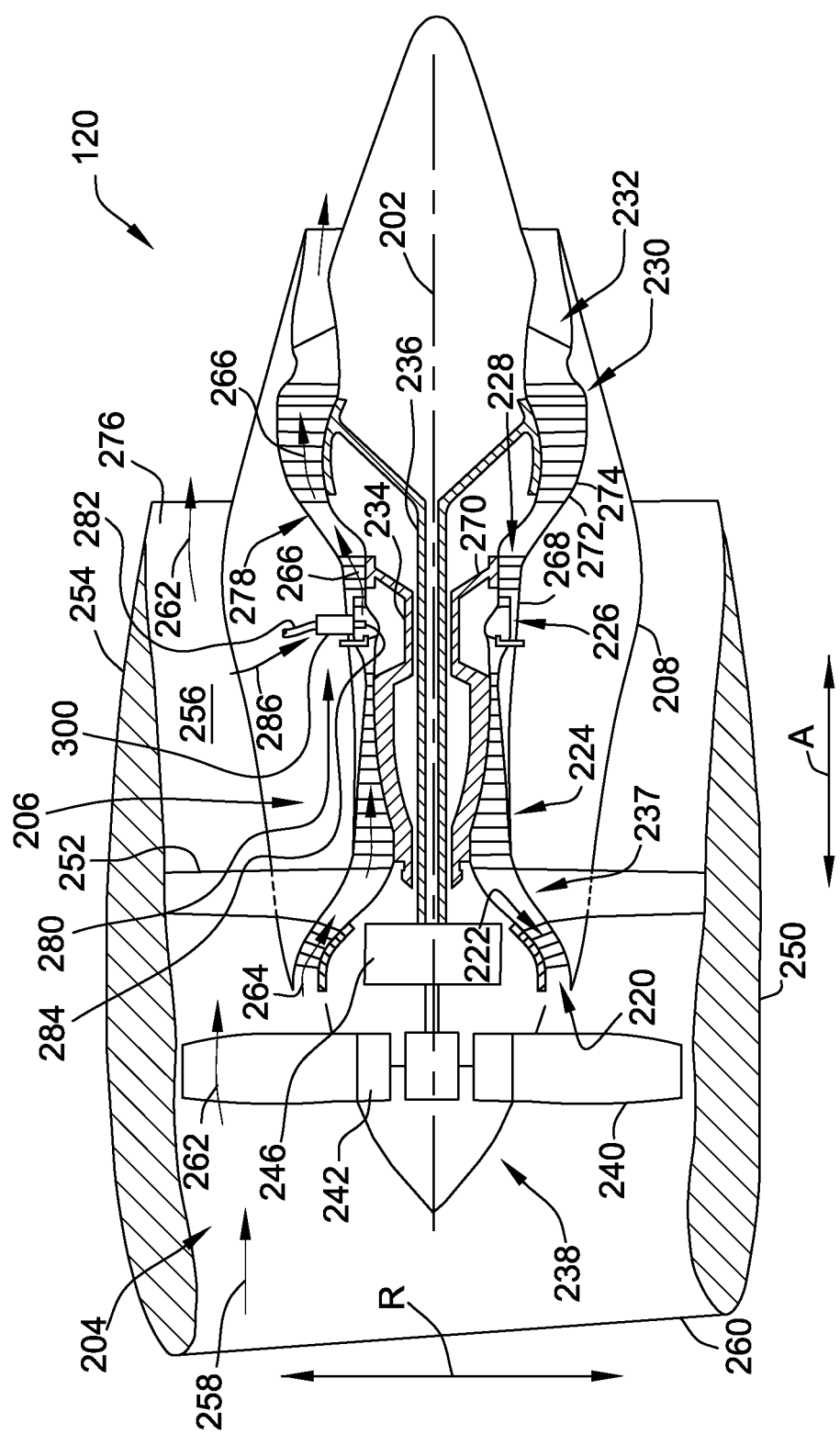
FIG. 2 is a schematic illustration of an exemplary gas turbine engine that may be used with the aircraft shown in FIG. 1.

FIG. 2 is a schematic cross-sectional view of gas turbine engine 120 in accordance with an exemplary embodiment of the present disclosure. In the example embodiment, gas turbine engine 120 is embodied in a high-bypass turbofan jet engine. As shown in FIG. 2, turbofan engine 120 defines an axial direction A (extending parallel to a longitudinal axis 202 provided for reference) and a radial direction R. In general, turbofan 120 includes a fan assembly 204 and a core turbine engine 206 disposed downstream from fan assembly 204.

In the example embodiment, core turbine engine 206 includes an engine case 208 that defines an annular inlet 220. Engine case 208 at least partially surrounds, in serial flow relationship, a compressor section including a booster or low pressure (LP) compressor 222 and a high pressure (HP) compressor 224; a combustion section 226; a turbine section including a high pressure (HP) turbine 228 and a low pressure (LP) turbine 230; and a jet exhaust nozzle section 232. A high pressure (HP) shaft or spool 234 drivingly connects HP turbine 228 to HP compressor 224.

A low pressure (LP) shaft or spool 236 drivingly connects LP turbine 230 to LP compressor 222. The compressor section, combustion section 226, turbine section, and nozzle section 232 together define a core air flowpath 237.

In the example embodiment, fan assembly 204 includes a fan 238 having a plurality of fan blades 240 coupled to a disk 242 in a spaced apart relationship. Fan blades 240 extend radially outwardly from disk 242. Fan blades 240 and disk 242 are together rotatable about longitudinal axis 202 by LP shaft 236 across a power gear box 246. Power gear box 246 includes a plurality of gears for adjusting the rotational speed of fan 238 relative to LP shaft 236 to a more efficient rotational fan speed.

Fan assembly 204 also includes an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass airflow passage 256 therebetween.

During operation of turbofan engine 120, a volume of air 258 enters turbofan 120 through an associated inlet 260 of nacelle 250 and/or fan assembly 204. As volume of air 258 passes across fan blades 240, a first portion 262 of volume of air 258 is directed or routed into bypass airflow passage 256 and a second portion 264 of volume of air 258 is directed or routed into core air flowpath 237, or more specifically into LP compressor 222. A ratio between first portion 262 and second portion 264 is commonly referred to as a bypass ratio. The pressure of second portion 264 is then increased as it is routed through high pressure (HP) compressor 224 and into combustion section 226, where it is mixed with fuel and burned to provide combustion gases 266.

Combustion gases 266 are routed through HP turbine 228 where a portion of thermal and/or kinetic energy from combustion gases 266 is extracted via sequential stages of HP turbine stator vanes 268 that are coupled to engine case 208 and HP turbine rotor blades 270 that are coupled to HP shaft or spool 234, thus causing HP shaft or spool 234 to rotate, which then drives a rotation of HP compressor 224. Combustion gases 266 are then routed through LP turbine 230 where a second portion of thermal and kinetic energy is extracted from combustion gases 266 via sequential stages of LP turbine stator vanes 272 that are coupled to engine case 208 and LP turbine rotor blades 274 that are coupled to LP shaft or spool 236, which drives a rotation of LP shaft or spool 236 and LP compressor 222 and/or rotation of fan 238.

Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass airflow passage 256 before it is exhausted from a fan nozzle exhaust section 276 of engine 120, also providing propulsive thrust. HP turbine 228, LP turbine 230, and jet exhaust nozzle section 232 at least partially define a hot gas path 278 for routing combustion gases 266 through core turbine engine 206.

Engine 120 further includes an ignition system 280. In the illustrated embodiment, ignition system 280 includes at least one ignition lead 282, each ignition lead 282 coupled to an igniter plug 284. Although only one ignition lead 282 and igniter plug 284 are illustrated in FIG. 2, it should be understood that engine 120 may include additional ignition leads 282 and igniter plugs 284 without departing from the scope of the present disclosure. Igniter plug 284 is configured to ignite the gases in combustion section 226 (to generate combustion gases 266). However, igniter plug 284 can only withstand a maximum thermal gradient thereacross, and therefore must be cooled. In the illustrated embodiment, cooling of igniter plug 284 is facilitated using a cooling shroud 300. As described further herein, cooling air 286 flows through cooling shroud 300 to impinge on igniter plug 284 to maintain an appropriate thermal gradient thereacross.

Turbofan engine 120 is depicted in the figures by way of example only, in other exemplary embodiments, turbofan engine 120 may have any other suitable configuration including for example, a turboprop engine, a military purpose engine, and a marine or land-based aero-derivative engine.

Figure 3:
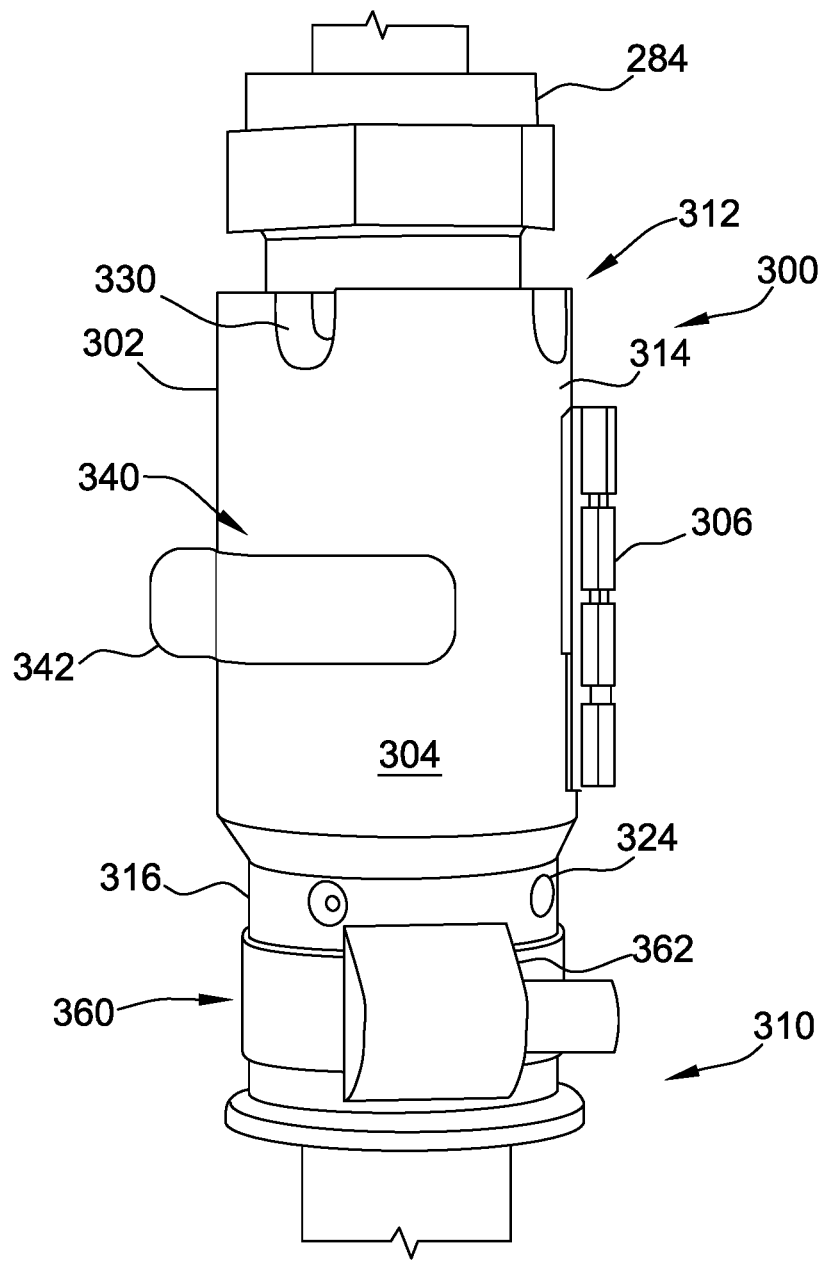
FIG. 3 is a first view of a first exemplary cooling shroud that may be used on one or more components of the engine shown in FIG. 2.
Figure 4:
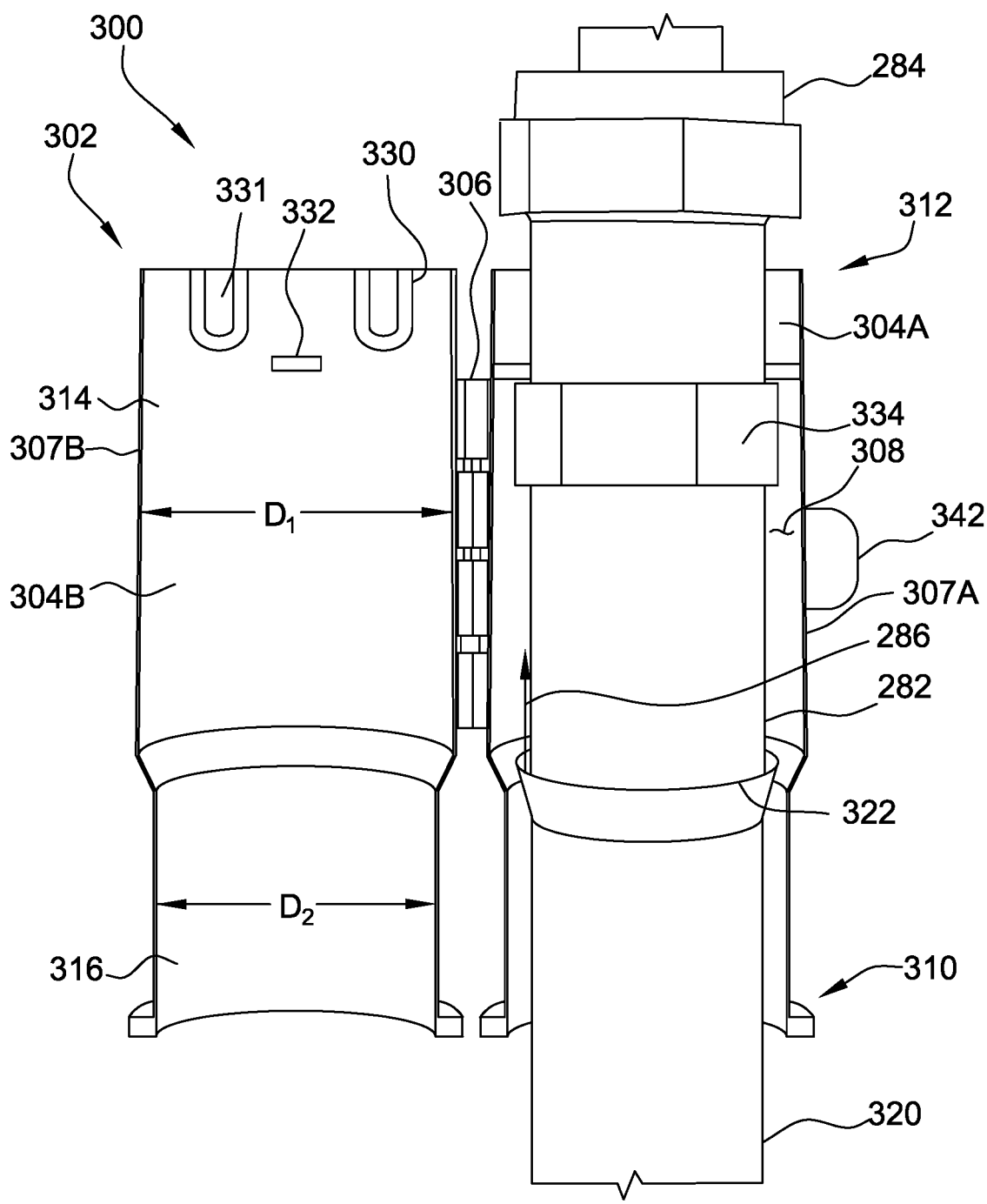
FIG. 4 is a second view of the cooling shroud shown in FIG. 3.

FIGS. 3 and 4 illustrate a first exemplary wire cooling shroud 300 that may be coupled to one or more components of turbofan engine 120 shown in FIG. 2 to cool the component(s). More particularly, FIG. 3 illustrates cooling shroud 300 in a closed configuration, secured around ignition lead 282 and igniter plug 284 (shown in FIG. 2). FIG. 4 illustrates cooling shroud in an open configuration around ignition lead 282 and igniter plug 284. Cooling shroud 300 includes a body 302, wherein body 302 is formed of a plurality of arcuate sections 304 hingedly coupled together. In the illustrated embodiment, body 302 includes two arcuate sections 304A, 304B that may be generally described as first and second clam-shell halves of body 302. Arcuate sections 304 hingedly coupled together via one of more hinges 306. In the illustrated embodiment, hinge 306 is coupled to arcuate section 304A at a first edge 305A of arcuate section 304A, and hinge 306 is coupled to arcuate section 304B at a first edge 305B of arcuate section 305B (see FIG. 6). In alternative embodiments, arcuate sections 304 are other than hingedly coupled together. For example, in one alternative embodiment, arcuate sections 304 are coupled together using one or more bands. The bands extend from first edge 305A of arcuate section 304A to first edge 305B of arcuate section 304B. The bands restrict relative movement of arcuate sections 304A, 304B such that arcuate sections 304A, 304B are kept within a predetermined distance (i.e., the length of the bands) from one another. In another alternative embodiment, one arcuate section 304A is retractable within another arcuate section 304B. Arcuate section 304B includes an open double wall construction at least partially therethrough, such that arcuate section 304A may be retracted at least partially therein during installation and/or removal of cooling shroud 300.

Body 302 defines an annular passage 308 therethrough, wherein annular passage 308 extends from an inlet end 310 of body 302 to a discharge end 312 of body 302 (opposite inlet end 310). Between inlet end 310 and discharge end 312, body 302 is substantially cylindrical. Body 302 includes a first portion 314, which extends from discharge end 312, and a second portion 316, which extends from inlet end 310. First portion 314 is generally cylindrical and has a first diameter D1. In the illustrated embodiment, body 302 narrows or tapers between first portion 314 and second portion 316, which has a smaller diameter D2 and a generally cylindrical profile. In an alternative embodiment, second portion has a diameter that is greater than or about equal to first diameter D1 of first portion 314. In one embodiment, body 302 (e.g., one or more of arcuate sections 304) is fabricated from steel. In additional embodiments, body 302 may be fabricated from any appropriate materials, including metals, alloys, polymers, ceramics, composites, and/or any other material that can withstand temperatures surrounding igniter plug 284.

In the illustrated embodiment of FIG. 4, ignition lead 282 includes a cooling fluid port 320 positioned therearound. Port 320 extends between an outlet end 322, which is disposed within cooling shroud 300 in the illustrated embodiment, and an inlet end (not shown), which is in flow communication with a source of cooling air 286 (e.g., an ambient environment around the inlet end). Second portion 316 of body 302 is secured around port 320 when shroud 300 is coupled to ignition lead 282 and igniter plug 284. In the illustrated embodiment, second portion 316 includes a plurality of dimples 324 configured to engage outlet end 322 of port 320, to facilitate appropriate and secure placement of shroud 300 around ignition lead 282. In an alternative embodiment, second portion 316 includes one or more tabs, an internal shoulder, and/or any other internal extension configured to engage outlet end 322 of port 320. Accordingly, outlet end 322 of port 320 discharges cooling air 286 within body 302 of shroud 300. Annular passage 308 defined by body 302 directs cooling air 286 to impinge on igniter plug 284 at discharge end 312 of body 302. In the example embodiment, discharge end 312 is at least partially open to an ambient environment surrounding body 302 (e.g., the ambient environment of the engine compartment surrounding engine 120).

In addition, discharge end 312 includes a plurality of indentations 330. In the illustrated embodiment, indentations 330 facilitate accurate placement of body 302 around ignition lead 282 and igniter plug 284. More specifically, a radially inner surface 331 of each indentation 330 contacts igniter plug 284 to ensure that igniter plug 284 is centered within annular passage 308. In some embodiments, cooling shroud 300 further includes one or more centering tabs 332 (see FIG. 4) adjacent to discharge end 312. Centering tabs 332 extend radially inwardly (e.g., into annular passage 308) and are configured to define a space between ignition lead 282 and/or igniter plug 284 and arcuate sections 304, such that cooling air 286 may pass through annular passage 308. A depth of indentations 330 and/or a length of centering tabs 332 affect(s) the space defined between ignition lead 282 and/or igniter plug 284. Indentations 330 and/or centering tabs 332 may be adjusted, positioned, and/or configured to permit air flow through discharge end 312 having one or more predetermined characteristics. For example, indentations 330 and/or centering tabs 332 may be extended radially into annular passage 308 or compressed radially outwardly from annular passage 308 to permit a predetermined volume of cooling air 286 through discharge end 312, or to permit cooling air 286 having a predetermined velocity to flow through discharge end 312.

In addition, centering tabs 332 may be configured to engage one or more elements of igniter plug 284 and/or ignition lead 282. In the illustrated embodiment, centering tabs 332 engage an interface bolt 334. Interface bolt 334 serves as a connection or interface between igniter plug 284 and ignition lead 282. In alternative embodiments, another component serves as the connection or interface between igniter plug 284 and ignition lead 282. For example, in one alternative embodiment, a tape or band couples igniter plug 284 to ignition lead 282. In other alternative embodiments, an adhesive members, a clamp, and/or a plurality of radially extending bolts or screws serves as the connection between ignition lead 282 and igniter plug 284. In the illustrated embodiment, centering tabs 332 engage interface bolt 334 to facilitate accurate and secure placement of shroud 300 around igniter plug 284 and ignition lead 282. For example, an installer may close arcuate sections 304 of body 302 about igniter plug 284 and ignition lead 282 at a location further upwards (i.e., towards igniter plug 284) and may shift body 302 downwards until they feel centering tabs 332 engage interface bolt 334. Such engagement provides a tactile indicator that body 302 is appropriately positioned, such that the installer may secure shroud 300 at that position. Although centering tabs 332 are shown as separate, rectangular tabs, centering tabs 332 may have any shape, size, and/or configuration.

Figure 5:
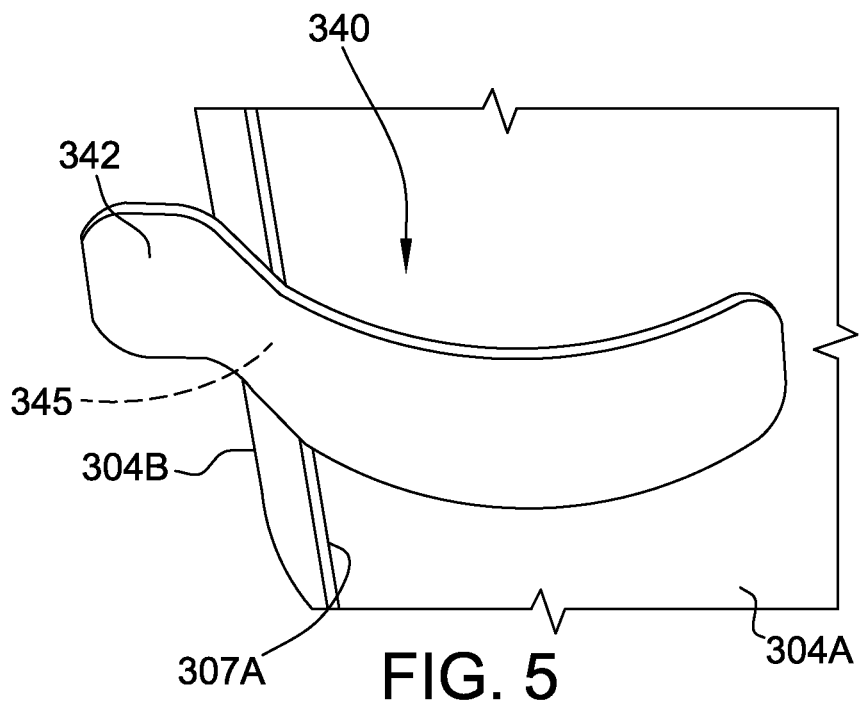
FIG. 5 is an expanded view of a closure assembly of the cooling shroud shown in FIG. 3.

With reference to FIGS. 3-5, shroud 300 further includes a closure assembly 340. Closure assembly 340 functions as a preliminary securement feature. Closure assembly 340 couples arcuate sections 304 together when arcuate sections 304 are initially brought together into the closed configuration shown in FIG. 3, enabling an installer to remove their hands from shroud 300 without arcuate sections 304 decoupling from each other or from igniter plug 284 and ignition lead 282. Accordingly, the installer can install shroud 300 with one hand and can subsequently secure (e.g., using a securing assembly 360, described herein) shroud 300 also with one hand (and/or with one tool and/or with one hand and one tool, depending on the securing assembly of shroud 300).

Closure assembly 340 includes, broadly, at least an engagement member and, in some embodiments, a receiving member, wherein the engagement member is positioned on one arcuate section 304A and the receiving member is positioned on an adjacent arcuate section (e.g., arcuate section 304B). In addition, in the illustrated embodiment of FIGS. 3-5, the engagement member is positioned on a second edge 307A of arcuate section 304A (opposite first edge 305A), and the receiving member is positioned on a second edge (e.g., a second edge 307B) of the adjacent arcuate section (e.g., arcuate section 304B). In the illustrated embodiment of FIGS. 3-5, the engagement member includes a bias member, or, more specifically, a bias tab 342. Bias tab 342 is coupled to a first arcuate section 304A and extends outwards from second edge 307A thereof. Moreover, bias tab 342 imparts a bias force against the adjacent arcuate section 304B when bias tab 342 engages the adjacent arcuate section 304B, removably coupling the two arcuate sections 304A, 304B together. Arcuate sector 304B may be said to include a receiving member for receiving and engaging the bias tab 342, wherein a side wall 345 of arcuate sector 304B defines the receiving member. In one embodiment, bias tab 342 is fabricated from a spring steel material that is resistance welded onto arcuate section 304A. In other embodiments, bias tab 342 is constructed from any appropriate material (e.g., any metal, alloy, polymer, etc.) and/or may be otherwise coupled to arcuate section 304A. Moreover in alternative embodiments, closure assembly 340 may have alternative structures.

Figure 9A:
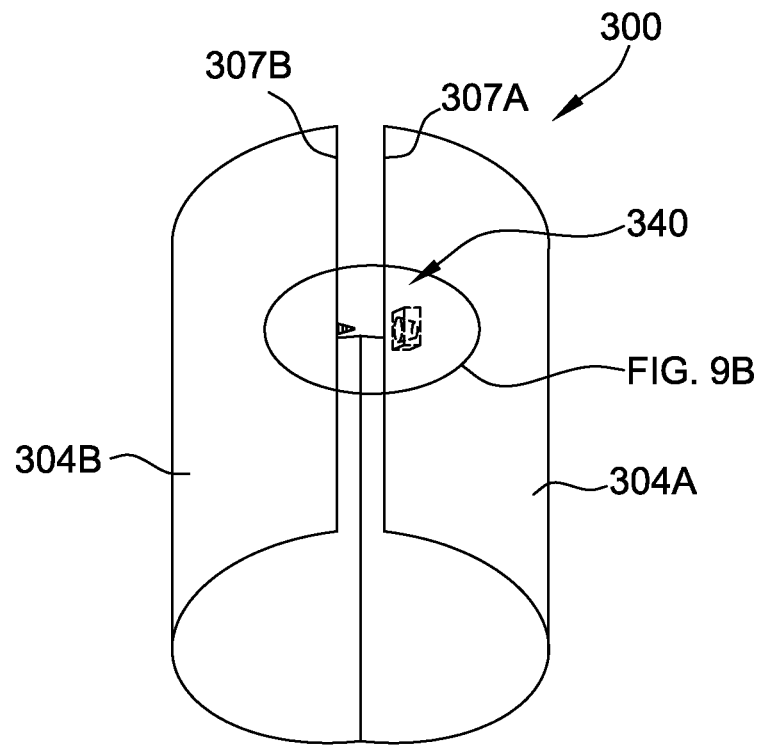
FIG. 9A is an illustration of another exemplary cooling shroud including an alternative closure assembly.
Figure 9B:
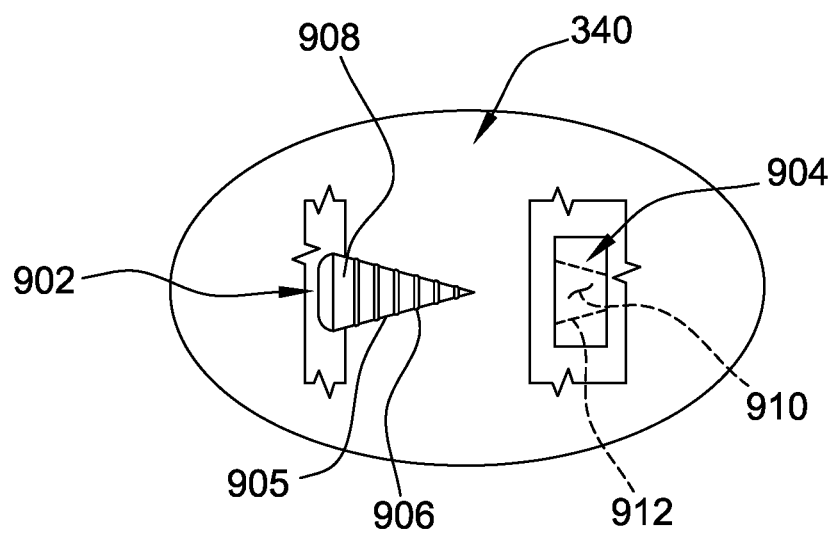
FIG. 9B is an expanded view of the alternative closure assembly shown in FIG. 9A.

For example, in an alternative embodiment of cooling shroud 300 shown in FIGS. 9A and 9B, closure assembly 340 includes an engagement member 902 and a receiving member 904. Engagement member 902 is located at second edge 307B of arcuate section 304B, and receiving member is located at second edge 307A of arcuate section 304A. Engagement member 902 includes an extension 905, wherein extension 905 includes a plurality of ridges 906 disposed on a tapering outer surface 908 thereof. Ridges 906 may include threads, in some embodiments. Receiving member 904 includes a tapering channel 910 defined in second edge 307A of arcuate section 304A. Tapering channel 910 includes a ridged inner surface 912. During installation, arcuate sections 304A, 304B are advanced towards each other until extension 905 is received in tapering channel 910. Ridged inner surface 912 of tapering channel 910 engages with ridges 906 of extension 905 in a snap-fit or friction fit, to retain engagement member 902 within receiving member 904 and secure arcuate sections 304A, 304B in the closed configuration. To transition cooling shroud 300 back to the open position, a technician need only exert a predetermined amount of force on arcuate section 304A away from arcuate section 304B to disengage ridges 906 and ridged inner surface 912.

Figure 10:
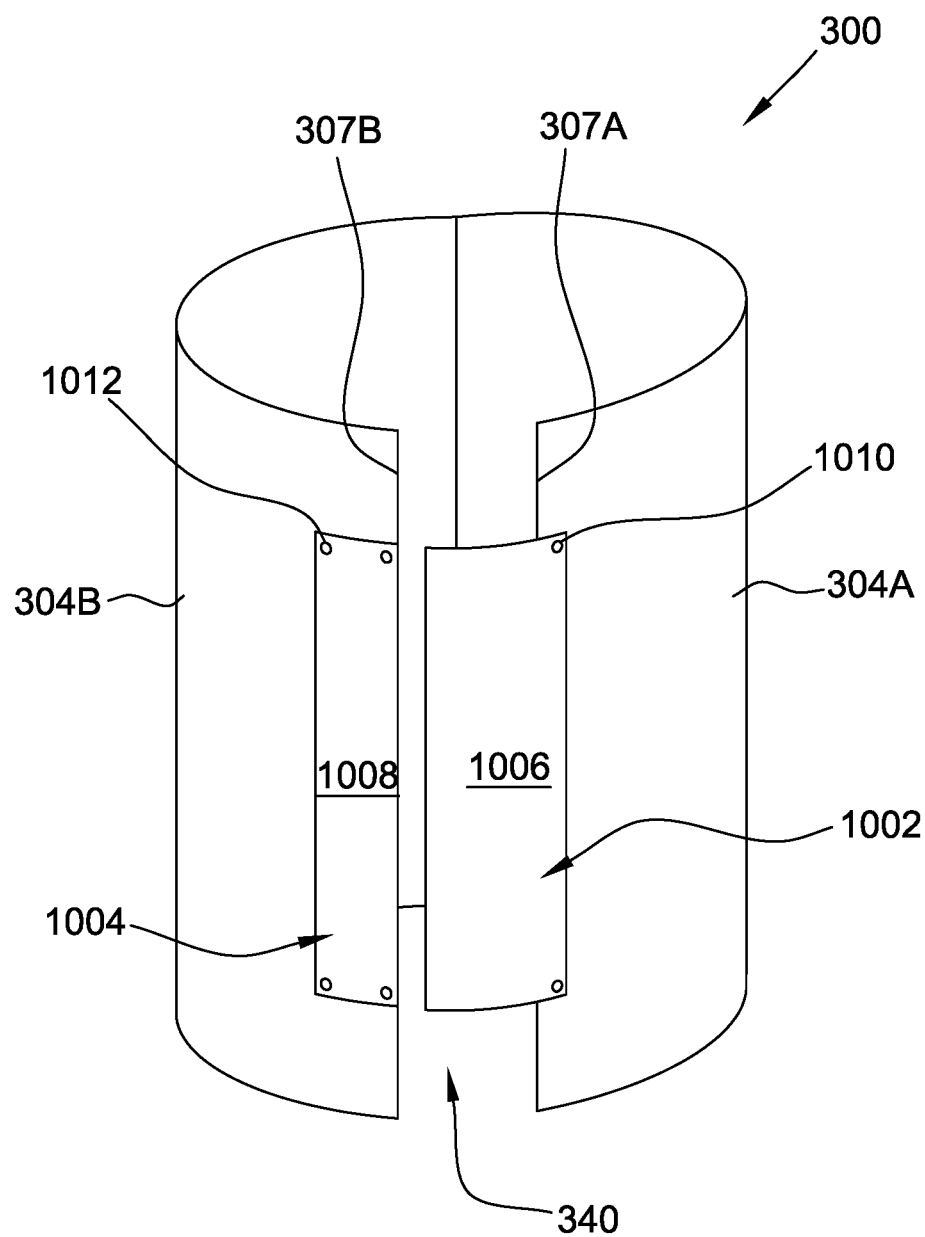
FIG. 10 is an illustration of another exemplary cooling shroud including another alternative closure assembly.

In an alternative embodiment of cooling shroud 300 illustrated in FIG. 10, closure assembly 340 includes an engagement member 1002 and a receiving member 1004. Engagement member 1002 is located on second edge 307A of arcuate section 304A, and receiving member 1004 is located on second edge 307B of arcuate section 304B. Engagement member 1002 includes a panel 1006 of one side of a hook-and-loop fastener (e.g., a fabric, such a metal or composite fabric that can withstand the temperature of igniter plug 332), and receiving member 1004 includes a panel 1008 of a complementary side of the hook-and-loop fastener. For example, panel 1006 may include hooks, and panel 1008 may include complementary loops; panel 1006 may include loops, and panel 1008 may include complementary hooks; or panel 1006 may include a combination of hooks and loops, and panel 1008 may also include a combination of hooks and loops. Panel 1006 is coupled to arcuate section 304A using one or more fasteners 1010, such as screws, bolts, or adhesive members. Panel 1008 is coupled to arcuate section 304B using one or more fasteners 1012, which may be the same as or different from fasteners 1010. During installation, arcuate sections 304A, 304B are advanced towards each other until panel 1006 engages with panel 1008. An installer may apply force to panel 1006 to ensure engagement between panel 1006 and panel 1008 (i.e., engagement of the hooks and loops of the hook-and-loop fasteners) and secure arcuate sections 304A, 304B in the closed configuration. Alternatively, panels 1006 and 1008 are fabricated from magnetized materials. During installation, arcuate sections 304A, 304B are advanced towards each other until panel 1006 magnetically engages with panel 1008. To remove cooling shroud 300, a technician may de-couple panel 1006 from panel 1008 (e.g., by exerting a pulling force on panel 1006, away from panel 1008) and transition cooling shroud 300 into the open configuration.

Figure 11A:
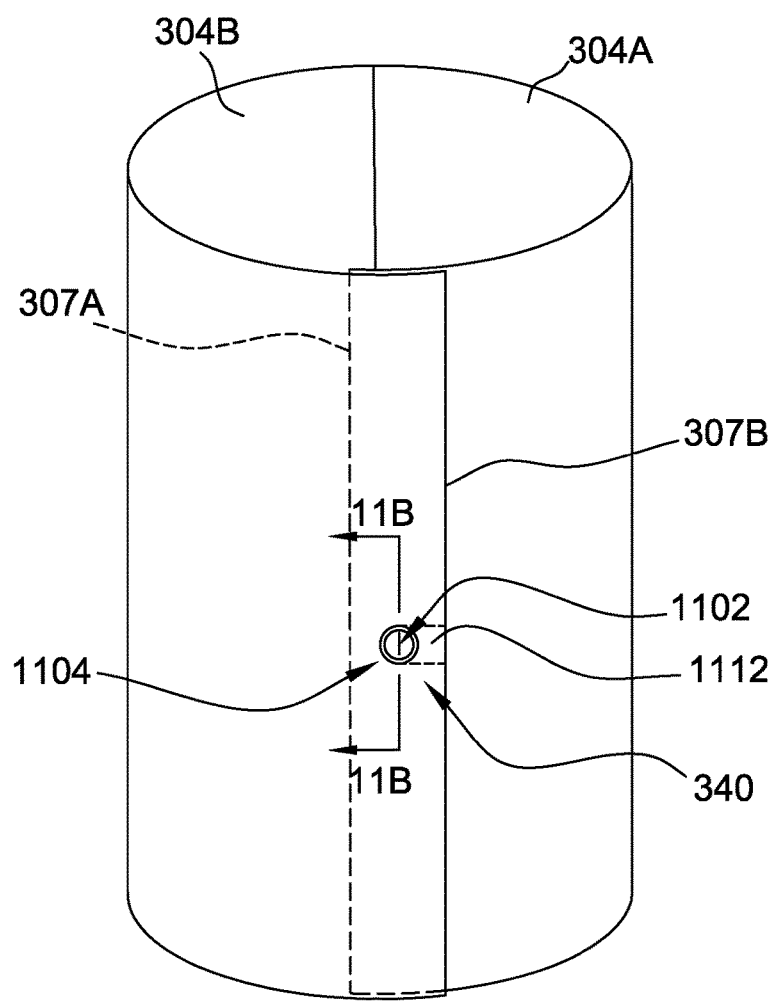
FIG. 11A is an illustration of another exemplary cooling shroud including another alternative closure assembly.
Figure 11B:
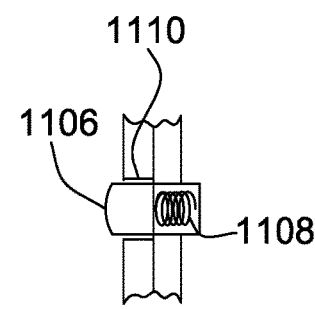
FIG. 11B is an expanded view of the alternative closure assembly shown in FIG. 11A.

In an alternative embodiment of cooling shroud 300 illustrated in FIGS. 11A and 11B, closure assembly 340 includes an engagement member 1102 and a receiving member 1104. Engagement member 1102 is located on second edge 307A of arcuate section 304A, and receiving member 1104 is located on second edge 307B of arcuate section 304B. Engagement member 1102 includes a spring pin 1106 having an internal spring 1108. Receiving member 1104 includes an opening 1110 defined in arcuate section 304B at second edge 307B. Receiving member 1104 further includes an angled inner surface 1112 of second edge 307B. During installation, arcuate sections 304A, 304B are advanced towards each other until spring pin 1106 contacts angled inner surface 1112. Angled inner surface 1112 compresses spring pin 1106 (and, therefore, spring 1108) gradually as arcuate section 304A, 304B are advanced further, until spring pin 1106 aligns with opening 1110. When spring pin 1106 aligns with opening 1110, spring 1108 de-compresses to advance spring pin 1106 at least partially through opening 1110. Spring pin 1106 is retained within opening 1110 to secure arcuate sections 304A, 304B in the closed configuration. Depressing spring pin 1106 within opening 1110 and exerting a force on arcuate section 304A away from arcuate section 304B facilitates transitioning cooling shroud 300 back to the open configuration.

Figure 12:
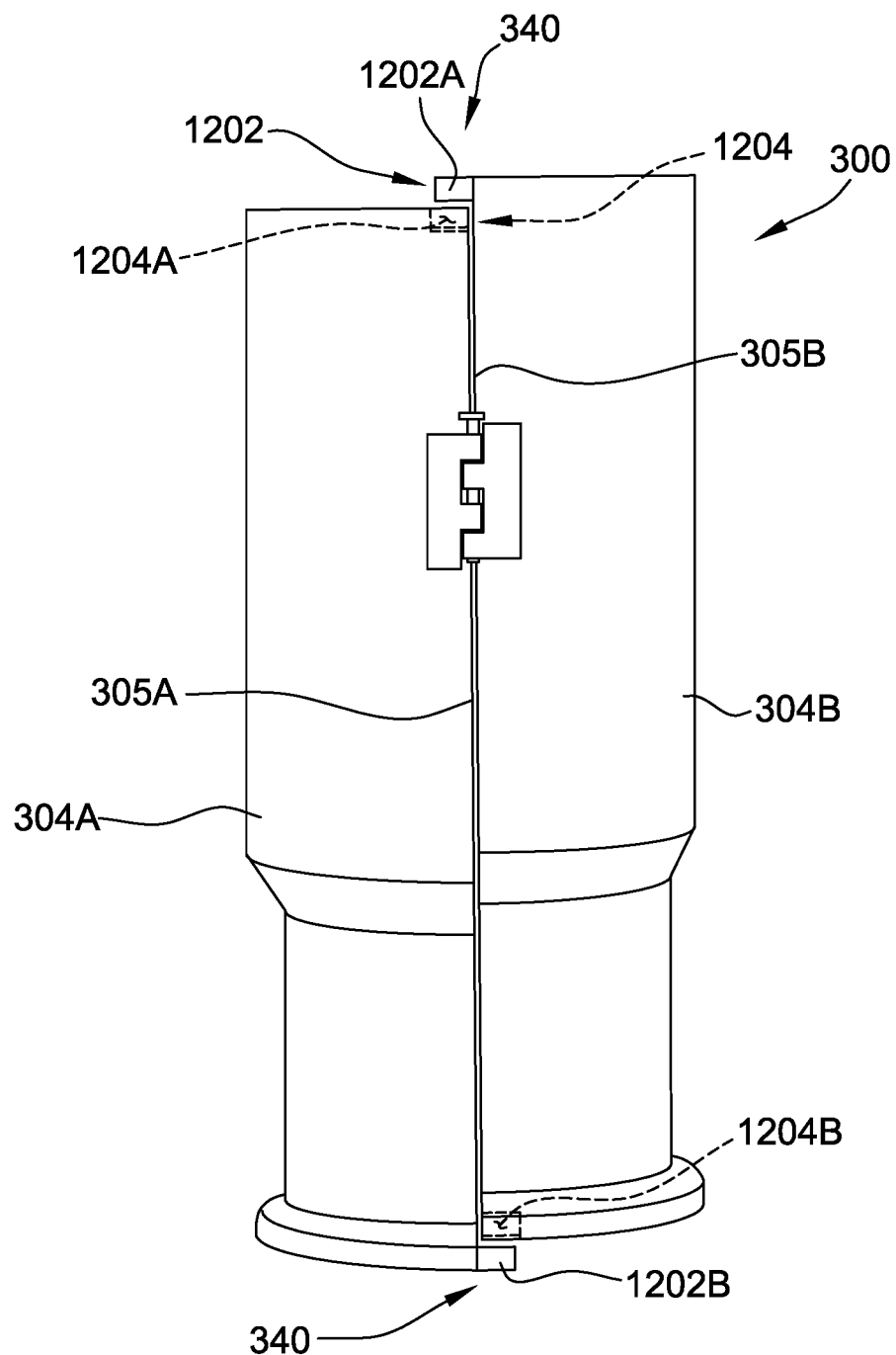
FIG. 12 is a side view of another exemplary cooling shroud including another alternative closure assembly.

In an alternative embodiment of cooling shroud 300 illustrated in FIG. 12, closure assembly 340 includes one or more engagement members 1202 (e.g., a first engagement member 1202A and a second engagement member 1202B) and one or more receiving members 1204 (e.g., a first receiving member 1204A and a second receiving member 1204B). In this embodiment, engagement members 1202A and 1202B are located, respectively, on first edge 305B of arcuate section 304B and first edge 305A of arcuate section 304A. Receiving members 1204A and 1204B are located, respectively, on first edge 305A of section arcuate section 304A and first edge 305B of first arcuate section 304B. Engagement members 1202 include tabs or extensions, and receiving members 1204 include channels or troughs configured to receive engagement members 1202 therein. In other embodiments, cooling shroud 300 includes only one engagement member 1202 located on one of first edge 305A and 305B and one receiving member located on the other of first edge 305A and 305B. Alternatively, both of engagement members 1202A and 1202B are located on one of first edge 305A and 305B and both receiving members 1204A and 1204B are located on the other of first edge 305A and 305B. Alternatively, one or more engagement members 1202 are located on one or more of second edge 307A and 307B of arcuate sections 304A and 304B, and one or more receiving members 1204 are located on one or more of second edge 307A and 307B. During installation, arcuate sections 304A and 304B are initially axially displaced from one another such that arcuate sections 304A and 304B are axially misaligned. Cooling shroud 300 is positioned for installation and arcuate sections 304A and 304B are advanced towards one another. Once second edges 307A and 307B are engaged with one another, one or both of arcuate sections 304A and 304B are shifted axially to insert engagement member(s) 1202 into receiving member(s) 1204 and to axially align arcuate sections 304A and 304B. Once engagement member(s) 1202 are positioned within receiving member(s) 1204, arcuate section 304A and 304B are retained in the closed configuration.

Figure 6:
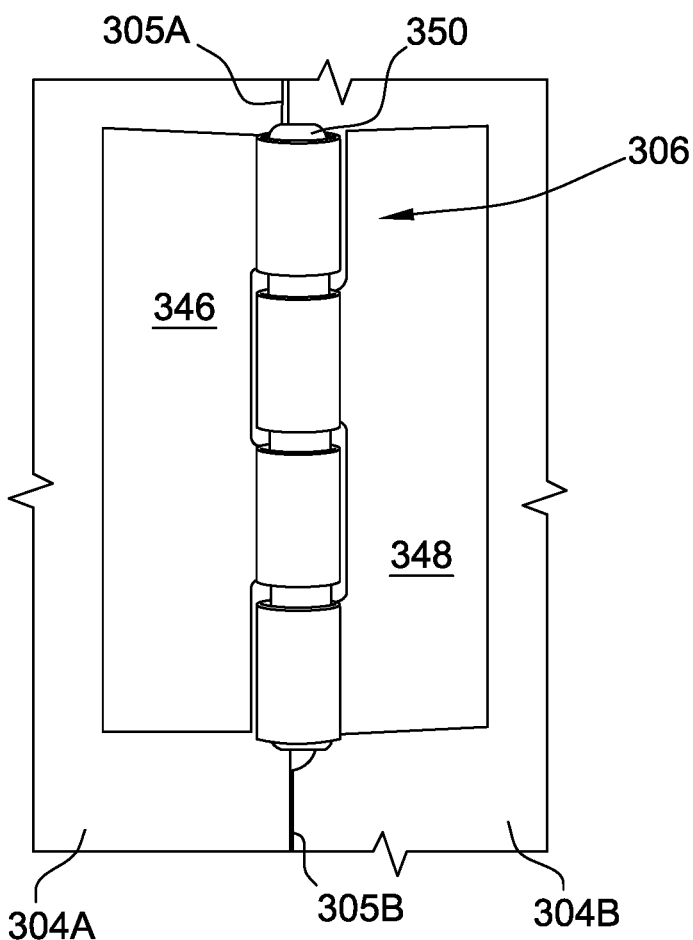
FIG. 6 is an expanded view of a hinge assembly of the cooling shroud shown in FIG. 3.

With reference to FIGS. 3, 4, and 6, hinge 306 of shroud 300 is embodied as a standard hinge with a first half 346 coupled to arcuate section 304A and a second half 348 coupled to adjacent arcuate section 304B. The two halves 346, 348 are coupled together via a pin 350. In one embodiment, the two halves 346, 348 are fabricated from a metal material that is welded to respective arcuate sections 304A, 304B. In any alternative embodiment, hinge 306 may be fabricated from any suitable material and/or may be otherwise coupled to arcuate sections 304A, 304B. For example, in one alternative embodiment, hinge 306 is embodied as a living hinge constructed of the same material as arcuate sections 304A, 304B. To transition shroud 300 from the open configuration shown in FIG. 4 to the closed configuration shown in FIG. 3, arcuate sections 304A, 304B are rotated towards each other about hinge 306 until arcuate sections 304A, 304B engage (e.g., via closure assembly 340).

Returning to FIG. 3, cooling shroud 300 is secured to ignition lead 282 and igniter plug 284 by a securing assembly 360 such that cooling shroud 300 does not move from its position during use of shroud 300, but is still removable from ignition lead 282 and igniter plug 284 during maintenance procedures. In the illustrated embodiment, securing assembly 360 is embodied as a clamping device, specifically a hose clamp 362. During installation of cooling shroud 300, arcuate sections 304A, 304B are preliminarily secured using closure assembly 340, hose clamp 362 is seated around second portion 316 of body 302, and hose clamp 362 is tightened (e.g., by hand or using a tool, depending on the specific implementation of hose clamp 362) to fully secure cooling shroud 300. "Fully secure", as used herein, refers to a level of securement at which movement of cooling shroud 300 with respect to ignition lead 282 and/or igniter plug 284 (and/or any other component of engine 120 to which cooling shroud 300 is secured) is substantially inhibited. Inlet end 310 includes a clamping shoulder 364 that extends radially from and circumferentially about inlet end 310. Clamping shoulder 364 is configured to limit axial movement of hose clamp 362 with respect to body 302 of cooling shroud 300, preventing hose clamp 362 from sliding off of cooling shroud 300 over inlet end 310. Securing assembly 360 may include additional and/or alternative components, including integral and/or external components. For example, in one alternative embodiment, shroud 300 includes an integral ratchet clamp built into one or more of arcuate sections 304. The ratchet clamp may include a manually actuatable button that, when manually depressed, causes body 302 of shroud 300 to clamp around ignition lead 282 and igniter plug 284.

Figure 13A:
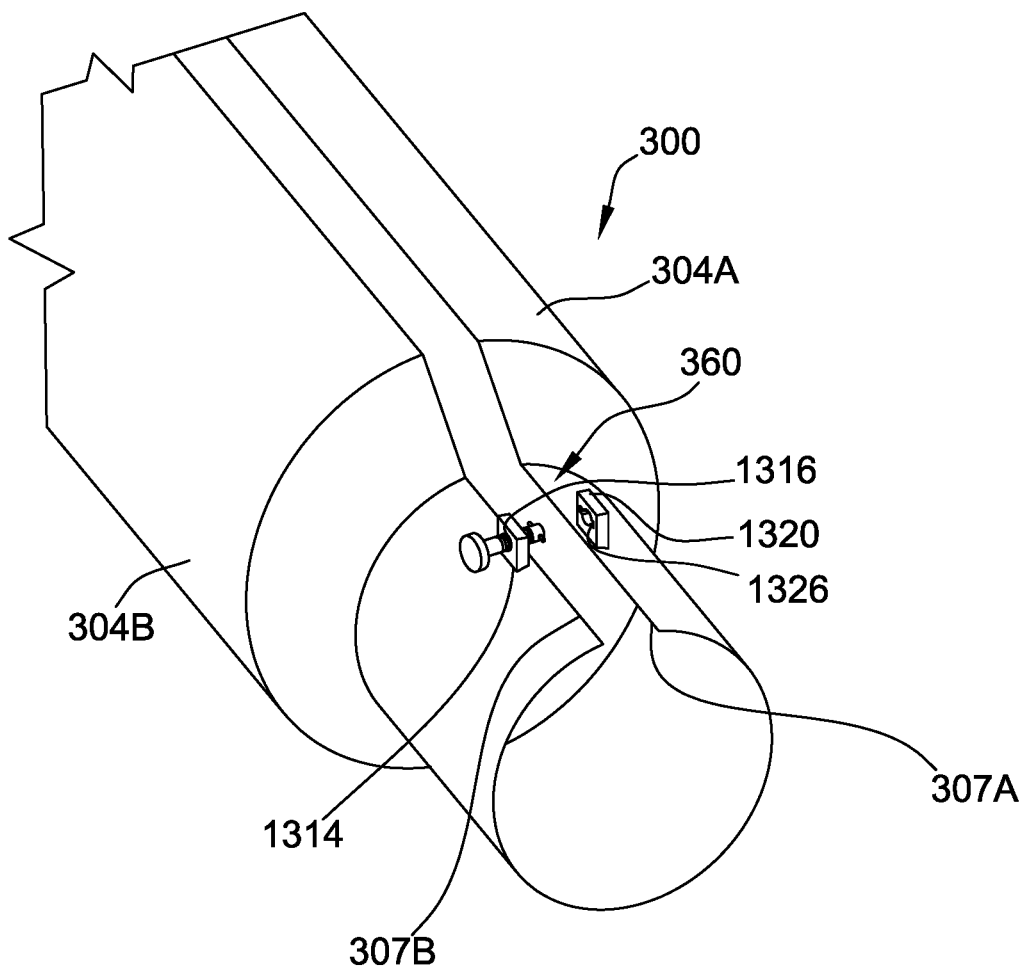
FIG. 13A is an illustration of another exemplary cooling shroud including an alternative securing assembly.
Figure 13B:
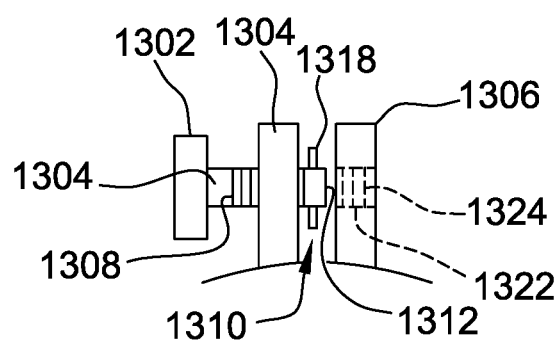
FIG. 13B is an expanded view of the alternative securing assembly shown in FIG. 13A.

In an alternative embodiment of cooling shroud 300 illustrated in FIGS. 13A and 13B, securing assembly 360 includes a capture screw 1302, a housing member 1304, and a receiving member 1306. Capture screw 1302 includes a plurality of external threads 1308 that extend around a shaft 1309, as well as a locking mechanism 1310 at one end 1312 of shaft 1309. Housing member 1304 includes a tab or extension 1314 that extends from second edge 307B of arcuate section 304B. Housing member 1304 defines an opening 1316 including a plurality of internal threads (not shown) such that capture screw 1302 is threaded through opening 1316 of housing member 1304. Alternatively, opening 1316 does not include internal threads but instead has a diameter that accommodates threads 1308 of capture screw 1302. Locking mechanism 1310 is configured to prevent capture screw 1302 from being decoupled from housing member 1304. In the illustrated embodiment, locking mechanism 1310 includes a pair of arms 1318 extending radially from shaft 1309. Receiving member 1306 includes a tab or extension 1320 that extends from second edge 307A of arcuate section 304A. Receiving member 1306 defines an opening 1322 therethrough, wherein opening 1322 includes a plurality of internal threads 1324. Receiving member 1306 also defines a pair of notches 1326 configured to receive arms 1318 of capture screw 1302. To secure cooling shroud 300 about a component, cooling shroud 300 is secured in the closed configuration using closure assembly 340. In so doing, in the illustrated embodiment, capture screw 1302 is inserted at least partially into opening 1322 in receiving member 1306. An installer then screws capture screw 1302 into receiving member 1306, engaging external threads 1308 of capture screw 1302 with internal threads of 1324 of receiving member 1306, until capture screw 1302 is fully threaded into receiving member 1306.

It should be understood that the particular embodiments of cooling shroud 300 illustrated and discussed herein are non-limiting examples. The features of cooling shroud 300 may be implemented differently without departing from the scope of the disclosure. For example, closure assembly 340 and/or securing assembly 360 may be implemented as one feature (e.g., as a ratchet clamp with a hook or snap closure feature) and/or may be oriented, positioned, and/or configured differently than specifically shown herein. Moreover, it should be understood that the cooling shrouds described herein are not limited to use on ignition system 280 of gas turbine engine 120 but rather can be used for cooling of a variety of engine components. In addition, the cooling shrouds and/or alternative embodiments thereof may be used in non-cooling implementations, where the cooling shrouds may facilitate airflow therethrough without requiring the airflow to be relatively cooler than an ambient environment and/or without requiring the airflow to have a cooling function. Accordingly, "cooling shrouds" may be referred to more broadly herein as "shrouds".

Figure 7:
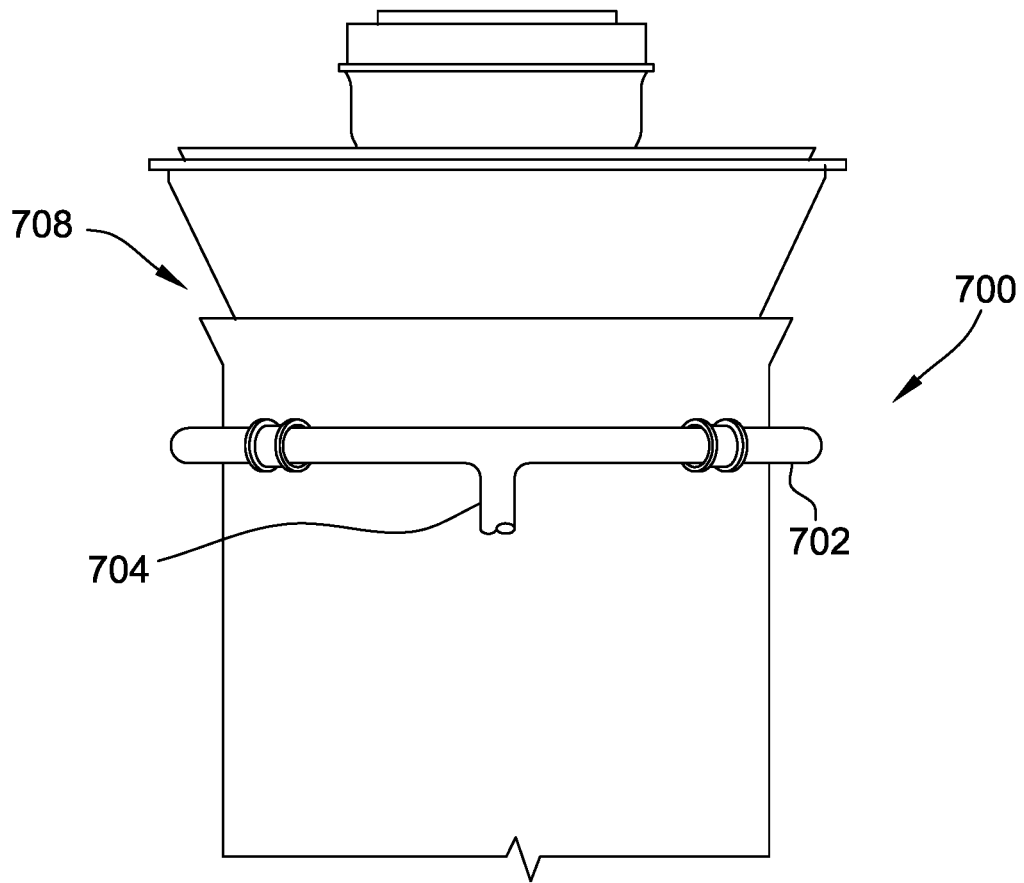
FIG. 7 is a schematic illustration of a clearance control system of the engine shown in FIG. 2.

For example, one embodiment of the shrouds described herein (and/or alternative embodiments thereof) may be used on a clearance control system of gas turbine engine 120. FIG. 7 is a schematic illustration of a clearance control system 700 of engine 120. More specifically, clearance control system 700 is positioned about engine case 208 (shown in FIG. 2) of engine 120 and is configured to channel air flow over engine case 208. Clearance control system 700 includes a plurality of arcuate duct sections 702 arranged circumferentially about engine case 208. In particular, clearance control system 700 may include four or eight duct sections 702. Duct sections 702 channel air from a source 704 to impinge on engine case 208. At least some know clearance control systems include connectors that connect adjacent duct sections. One end of a first duct section is inserted into a first end of the connector, and another end of an adjacent duct section is inserted into a second opposing end of the connector, and so on and so forth to serially connect all of the duct sections about the engine case. However, it can be difficult and inconvenient to service any one part of these clearance control systems, as connectors and each duct section connected thereto must be removed.

Figure 8:
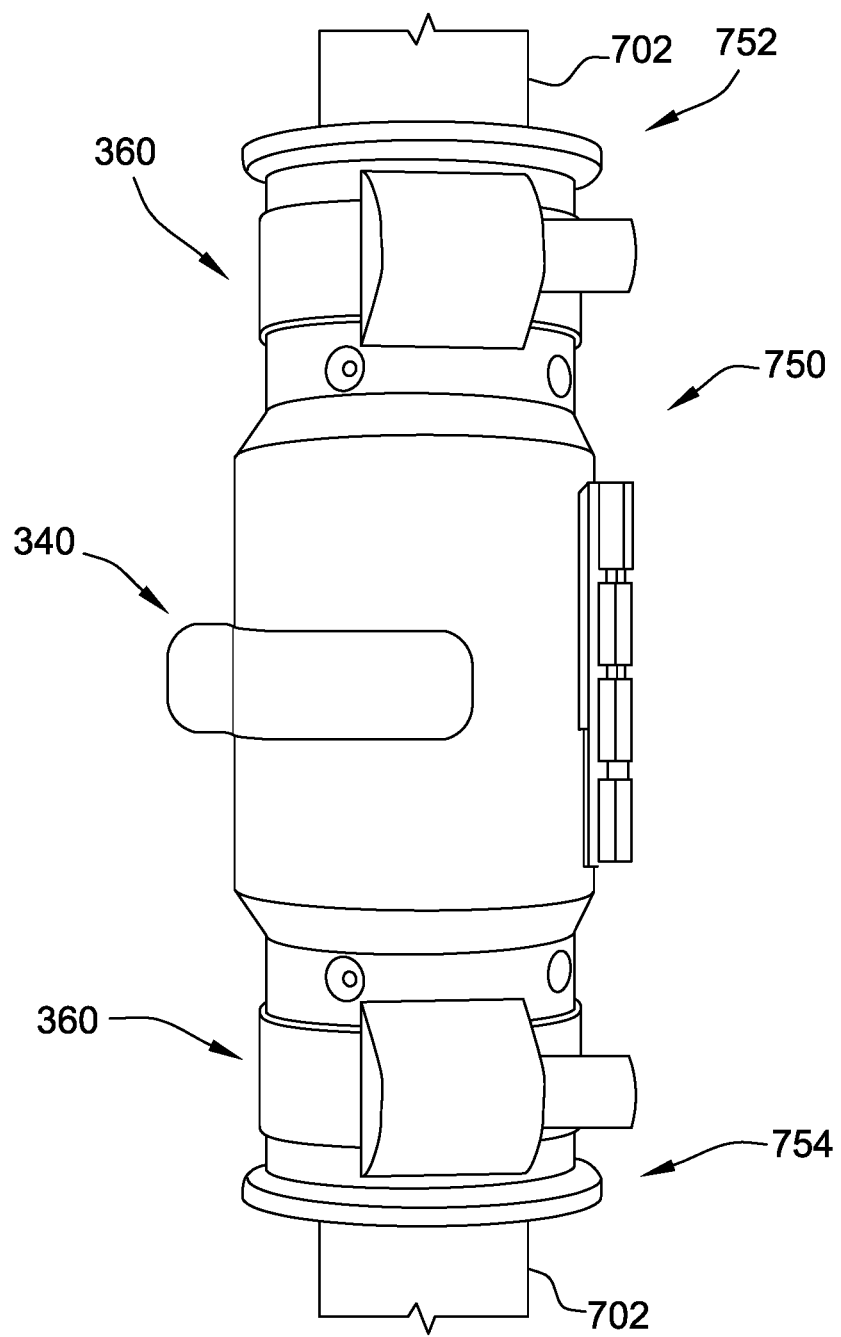
FIG. 8 is an illustration of a second exemplary cooling shroud that may be used on one or more components of the engine shown in FIG. 2.

Clearance control system 700 illustrated in FIG. 7 includes shrouds 750 similar to cooling shrouds 300 shown in FIGS. 3-6. Shrouds 750 are configured to couple adjacent duct sections 702 together and to enable airflow therebetween. An example embodiment of a shroud 750 is illustrated in FIG. 8. In this embodiment of shroud 750, many of the features are similar to those shown and described with respect to cooling shroud 300. However, shroud 750 includes two substantially identical "inlet ends" or, in this embodiment, coupling ends 752, 754. Each coupling end 752, 754 is configured to couple to one end of a duct section 702. In addition, each coupling end 752, 754 includes a securing assembly 360 for fully but removably securing the respective coupling end 752, 754 to the respective duct section 702.

Accordingly, using shrouds 750 as connectors enables simpler maintenance and installation of duct sections 702 of clearance control system 700. An operator need only unclamp and de-couple adjacent arcuate sections 304 of each shroud 750 on the ends of any one duct section 702 that needs to be removed and/or or repaired, and that duct section 702 may be simply withdrawn without affecting any of the other remaining duct sections 702. When a duct section 702 is installed, an installer can simply position the duct section 702 in place (e.g., adjacent another duct section), and shroud 750 can be placed around the ends of the two duct sections 702 and closed (using closure assembly 340) to preliminarily secure shroud 750, as described above herein. A second shroud 750 can be similarly installed on the opposing end of the installed duct section 702, and the two shrouds 750 can be fully secured via the securing assemblies 360.

The above-described embodiments of a cooling shroud facilitate single-handed assembly and installation thereof. Such shrouds improve simplicity and decrease maintenance and installation time of some of the more commonly serviced engine components. In addition, the embodiments of the cooling shrouds described herein decrease opportunity for loss of components of the shrouds (e.g., arcuate sections, loose bolts, etc.) within the engine compartment. These improvements may facilitate decreased installation time and, therefore, costs, while enabling the design of smaller and more efficient engine compartments.

Exemplary embodiments of cooling shrouds (or, more broadly, "shrouds") are described above in detail. The shrouds, and methods of operating such devices, are not limited to the specific embodiments described herein, but rather, components of the devices and/or steps of the methods may be utilized independently and separately from other components and/or steps described herein. For example, the shrouds may also be used in combination with other systems and/or devices requiring cooling of a machine component and/or airflow between components, and are not limited to practice with only the systems and methods as described herein. Rather, the exemplary embodiment can be implemented and utilized in connection with many other machinery applications that are currently configured to receive and accept cooling devices and systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shroud configured for installation on a component of a machine, said shroud comprising:
   a shroud body comprising a plurality of arcuate sections hingedly coupled together, said shroud body having a discharge end and an inlet end, and wherein said discharge end comprises a centering tab extending inwardly along a radial direction, said centering tab configured to engage an electrical connector to be cooled, said radially inwardly extending centering tab defining a space for the passage of cooling fluid between the electrical connector and said shroud body; and
   a closure assembly comprising an engagement member and a receiving member,
   wherein said plurality of arcuate sections comprise:
      a first arcuate section hingedly coupled to one of said plurality of arcuate sections at a first edge of said first arcuate section and including said engagement member at an opposing second edge of said first arcuate section; and
      a second arcuate section hingedly coupled to one of said plurality of arcuate sections at a first edge of said second arcuate section and including said receiving member at an opposing second edge of said second arcuate section,
   wherein said shroud body is configured to transition between an open configuration in which said engagement member and said receiving member are spaced apart from one another and a closed configuration in which said engagement member engages with said receiving member, said closure assembly maintaining said shroud body in the closed configuration.

2. The shroud of claim 1, wherein said shroud body comprises an approximately cylindrical shroud body extending between said discharge end and said inlet end.

3. The shroud of claim 2, wherein said discharge end is at least partially open to an ambient environment surrounding said shroud body.

4. The shroud of claim 2, wherein said discharge end has a first diameter and said inlet end has a second diameter, and wherein said second diameter is smaller than said first diameter.

5. The shroud of claim 2, wherein said shroud body includes a plurality of indentations at said discharge end.

6. The shroud of claim 2, further comprising a clamping shoulder that extends away from an outer surface of said inlet end along the radial direction and about the outer surface of said inlet end along a circumferential direction, said clamping shoulder is configured to limit movement of a clamping device with respect to said shroud body along an axial direction.

7. The shroud of claim 1, wherein said engagement member comprises a bias member.

8. The shroud of claim 7, wherein said bias member comprises a spring steel material.

9. The shroud of claim 1, further comprising a securing assembly configured to fully secure said shroud body in the closed configuration.

10. The shroud of claim 9, wherein said securing assembly comprises a hose clamp.

11. A gas turbine engine comprising:
    a core engine including a compressor; and
    an ignition system configured to ignite gas in said core engine, said ignition system comprising a cooling shroud configured to cool a component of said ignition system, said cooling shroud comprising:
       a shroud body comprising a plurality of arcuate sections hingedly coupled together, said shroud body comprising a discharge end and an inlet end, and wherein said discharge end comprises a centering tab extending inwardly along a radial direction, said centering tab configured to engage the component to be cooled, said radially inwardly extending centering tab defining a space for the passage of cooling fluid between the component and said shroud body; and
       a closure assembly comprising an engagement member and a receiving member,
       wherein said plurality of arcuate sections comprise:
          a first arcuate section hingedly coupled to one of said plurality of arcuate sections at a first edge of said first arcuate section and including said engagement member at an opposing second edge of said first arcuate section; and
          a second arcuate section hingedly coupled to one of said plurality of arcuate sections at a first edge of said second arcuate section and including said receiving member at an opposing second edge of said second arcuate section, wherein said shroud body is configured to transition between an open configuration in which said engagement member and said receiving member are spaced apart from one another and a closed configuration in which said engagement member engages with said receiving member, said closure assembly maintaining said shroud body in the closed configuration.

12. The gas turbine engine of claim 11, wherein said shroud body comprises an approximately cylindrical shroud body extending between the discharge end and the inlet end.

13. The gas turbine engine of claim 12, wherein said discharge end is at least partially open to an ambient environment surrounding said shroud body.

14. The gas turbine engine of claim 12, wherein said discharge end has a first diameter and said inlet end has a second diameter, and wherein said second diameter is smaller than said first diameter.

15. The gas turbine engine of claim 12, wherein said shroud body includes a plurality of indentations at said discharge end.

16. The gas turbine engine of claim 12, wherein said cooling shroud further comprises a clamping shoulder that extends away from an outer surface of said inlet end along the radial direction and about said outer surface of said inlet end along a circumferential direction, said clamping shoulder is configured to limit movement of a clamping device with respect to said shroud body along an axial direction.

17. The gas turbine engine of claim 11, wherein said engagement member comprises a bias member.

18. The gas turbine engine of claim 17, wherein said bias member comprises a spring steel material.

19. A method of constructing a component cooling shroud configured for installation on a component of a gas turbine engine, said method comprising:
   providing a plurality of arcuate sections, the plurality of arcuate sections including a first arcuate section including an engagement member at a first edge of the first arcuate section, and a second arcuate section including a receiving member at a first edge of the second arcuate section; and
   forming a shroud body from the plurality of arcuate sections, said shroud body comprising a discharge end and an inlet end, said discharge end comprising a centering tab extending inwardly along a radial direction, said forming comprising:
      hingedly coupling the first arcuate section to one of the plurality of arcuate sections at an opposing second edge of the first arcuate section; and
      hingedly coupling the second arcuate section to one of the plurality of arcuate sections at an opposing second edge of the second arcuate section, such that the shroud body is configured to transition between an open configuration in which the engagement member and the receiving member are spaced apart from one another and a closed configuration in which the engagement member engages with the receiving member, the engagement member and the receiving member maintaining the shroud body in the closed configuration.

20. The method of claim 19 further comprising removably coupling a securing assembly to the shroud body, the securing assembly configured to fully secure the shroud body in the closed configuration by tightening the securing assembly to substantially inhibit movement of the shroud body with respect to the component of the gas turbine engine.

21. A shroud configured for installation on a component of a gas turbine engine, said shroud comprising:
   a shroud body comprising a plurality of arcuate sections hingedly coupled together, said shroud body comprising a discharge end and an inlet end, said discharge end having a first diameter and said inlet end having a second diameter, and wherein said second diameter is smaller than said first diameter; and
   a closure assembly comprising an engagement member and a receiving member,
   wherein said plurality of arcuate sections comprise:
      a first arcuate section hingedly coupled to one of said plurality of arcuate sections at a first edge of said first arcuate section and including said engagement member at said first edge of said first arcuate section; and
      a second arcuate section hingedly coupled to one of said plurality of arcuate sections at a first edge of said second arcuate section and including said receiving member at said first edge of said second arcuate section,
   wherein said shroud body is configured to transition between an open configuration in which said engagement member and said receiving member are spaced apart from one another and a closed configuration in which said engagement member engages with said receiving member, said closure assembly maintaining said shroud body in the closed configuration.

* * * * *